Patented Nov. 21, 1939

2,180,805

UNITED STATES PATENT OFFICE 2,180,805

α-AMINO-ANTHRAQUINONES AND PROCESS OF MAKING SAME

Friedrich Felix, Basel, Paul Grossmann, Binningen, and Max Bommer, Riehen, Switzerland, assignors to the firm of Society of Chemical Industry in Basle, Basel, Switzerland No Drawing. Application February 1, 1938, Serial No. 188,190. In Switzerland February 3, 1937

6 Claims. (Cl. 260—371)

It has been found that new, valuable dyestuffs of the anthraquinone series are obtained by causing α-amino-anthraquinones which contain in one α-position an alkyl radical substituted by a mobile halogen atom to react in the heat with alkali salts of thiosulfuric acid. There are thus obtained water-soluble 1-amino-anthraquinone derivatives which are characterized by containing at least one amino group which corresponds to the general formula

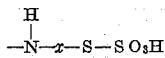

wherein $x$ stands for alkylene. These products, in the form of their alkali salts, dissolve in water to red, to violet, to blue and to green solutions and dye the fiber, for instance wool, from an acid bath tints of the above indicated shades which may be characterized by excellent purity. These new dyestuffs can also be used with success for other purposes, for example for printing, particularly for printing artificial silk from esters of cellulose, i. e., the so-called acetate artificial silk. Prints are then obtained which are also characterized by their purity and which, besides other valuable fastness properties, possess the valuable property of being fast to sublimation. The new dyestuffs can be further used for the manufacture of pigments for dyeing artificial masses and the like.

For manufacturing such dyestuffs one proceeds preferably in such a manner that amino-anthraquinones which contain a primary amino-group in at least one α-position, are treated with such alkylating agents which introduce alkyl radicals substituted by halogen atoms. Such agents are for example epichlorohydrin or epibromohydrin. There are thus formed α-amino groups substituted by alkyl radicals of which the alkyl radicals are simultaneously substituted by hydroxyl groups. By causing these products to react with salts of thiosulfuric acid there are obtained products of the general formula

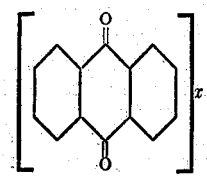

wherein $x$ represents an amino group standing in α-position, of the formula

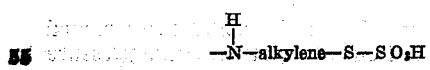

in which general formula the alkylene radical is substituted by a hydroxyl group.

Another method for obtaining such compounds consists in exchanging in α-amino-anthraquinones substituted at the nitrogen atom by alkyl radicals containing OH-groups, the OH-groups of the hydroxyalkyl radicals for halogen. As is known, this can be effected by treating these hydroxyalkyl compounds with hydrohalic acids, such as hydrochloric acid or hydrobromic acid, halides of phosphorus and sulfur, such as phosphorus pentachloride, thionylchloride and the like. By the reaction of these products with salts of thiosulfuric acid there are obtained products of the general formula

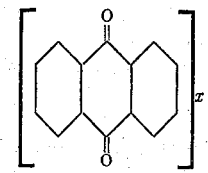

wherein $x$ represents an amino group standing in α-position, of the formula

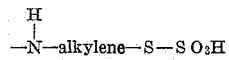

in which general formula the alkylene radical is not substituted by OH-groups.

The following examples illustrate the manufacture and also the application of the new dyestuffs:

*Example 1*

30 parts of 1-amino-4-methylamino-anthraquinone are dissolved in 120 parts of glacial acetic acid, and are converted into 1-γ-chloro-β-hydroxypropylamino) - 4 - methylaminoanthraquinone by addition of 45 parts of epichlorhydrin.

20 parts of 1-methylamino-4-(γ-chloro-β-hydroxypropylamino)-anthraquinone, 250 parts of acetone, 250 parts of water and 20 parts of sodium thiosulfate are together heated to 100–120° C. in a closed vessel for 5 hours whereby a water-soluble product is produced. The acetone is distilled and the dyestuff of the formula

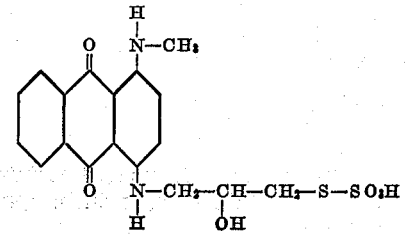

separated by means of ammonium chloride. It is filtered and dried. It is a dark powder soluble in water to a blue solution and dyeing in aqueous solution acetate artificial silk blue tints.

In similar manner the thiosulfate residue may be introduced into 1-anilido-4-(γ-chloro-β-hydroxypropylamino)-anthraquinone, into 1-amino-4-(β-chlorethylamino)-anthraquinone, into 1-β-hydroxyethylamino - 4 - β - chlorethylaminoanthraquinone, into 1-(β-chlorethylamino)-, 1:4-di-(β-chlorethylamino)- 5 : 8 - dihydroxyanthraquinone and 1:4:5-di-(β-chlorethylamino)-8-hydroxyanthraquinone or the like. There are thus obtained products such as

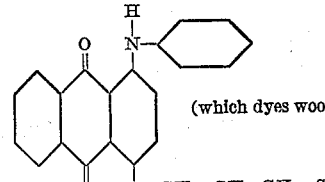

(which dyes wool greenish blue tints)

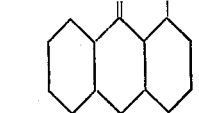
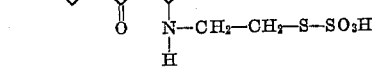

(which dyes wool violet tints)

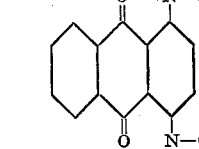
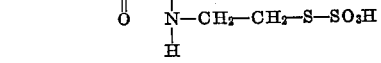

(which dyes wool blue tints)

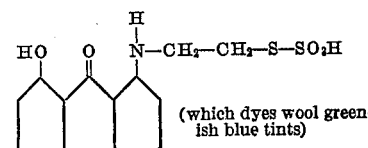

(which dyes wool greenish blue tints)

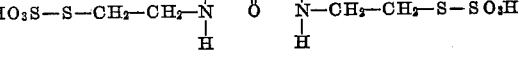

Example 2

4 parts of the 1-(γ-chloro-β-hydroxypropylamino)-anthraquinone made from 1-amino-anthraquinone by reaction with epichlorhydrin are mixed with 100 parts of a mixture of 50 parts of water, 50 parts of acetone and 4 parts of crystallized sodium thiosulfate, and the whole is heated under pressure at 120° C. for 12 hours. There is obtained a water-soluble dyestuff of the formula

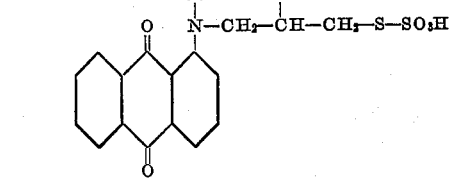

which colors both animal fibres and acetate artificial silk in a dye bath or by printing pure red tints.

Example 3

40 parts of the product of the reaction of 1:4-diaminoanthraquinone with an excess of epichlorhydrin in glacial acetic acid at 60° C. are caused to react in 500 parts of water and 500 parts of ethyl alcohol with 40 parts of sodium thiosulfate for 5 hours by heating to 120° C. under pressure. There is obtained a water-soluble deep blue dyestuff of the formula

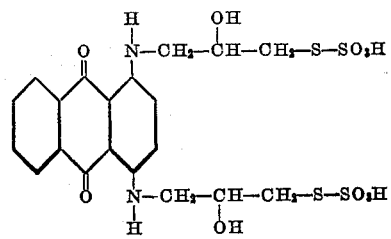

suitable for dyeing and printing animal fibres and acetate artificial silk.

In quite analogous manner there is obtained from 1-amino-4-(4'-aminophenylamino)-anthraquinone by successive reaction with epichlorhydrin and sodium thiosulfate a green water-soluble dyestuff.

Example 4

0.2 part of the dyestuff of Example 3 is dissolved in 400 parts of water and there is added to this bath 1 part of crystallized sodium sulfate; 10 parts of wool are then entered into the bath and 0.4 part of concentrated formic acid is added. The bath is heated to boiling and dyeing continued for one hour at 95–100° C. After washing and drying the dyeing is a pure deep blue.

Example 5

Acetate artificial silk is printed in accordance with the following prescription:

1– 2 parts of the dyestuff of Example 1, first paragraph are dissolved in
29–28 parts of water and there are introduced
70 parts of gum thickening 1:1

100 parts or

1– 2 parts of the dyestuff of Example 1 second paragraph are dissolved in
30–29 parts of water and
65 parts of gum thickening 1:1 and
4 parts of urea are introduced.

100 parts.

After printing and drying the goods are steamed in a boiler for about ¾ hour at ¼ atmosphere pressure and then thoroughly rinsed. There are obtained penetrating brilliant blue prints on acetate artificial silk.

Example 6

Chlorinated wool is printed in accordance with the following prescription:

1– 2 parts of the dyestuff of Example 1, second paragraph, are dissolved in
26–23 parts of water and
5 parts of glycerine, and there are introduced
65 parts of gum thickening 1:1 and
5 parts of tartaric acid 1:1

100 parts.

After printing and drying the goods are steamed in a boiler for ¾ hour at ¼ atmosphere pressure and then well rinsed. There are obtained penetrating brilliant blue prints on the wool.

What we claim is:

1. α-aminoanthraquinones in which at least one amino group is substituted by a substituent of the formula $x-S-SO_3H$ wherein $x$ represents a radical selected from the group consisting of the alkylene and hydroxyalkylene radicals containing at least 2 and not more than 3 carbon atoms, which products form dark powders which dissolve in water to red to violet, to blue and to blue-green solutions and dye the fiber similar tints.

2. α-amino-anthraquinones of the general formula

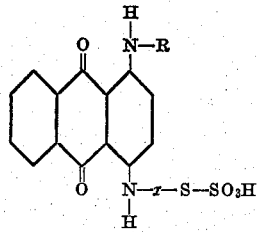

in which R stands for a member of the group consisting of H, alkyl and a six-membered aromatic nucleus, and $x$ stands for a radical selected from the group consisting of the alkylene and hydroxyalkylene radicals containing at least 2 and not more than 3 carbon atoms, which products form dark powders which dissolve in water to violet to blue and to green-blue solutions and dye the fiber similar tints.

3. The product of the formula

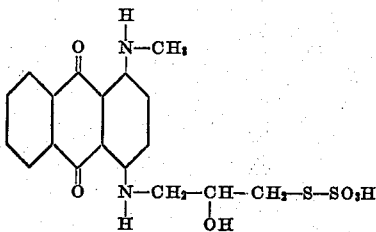

4. The product of the formula

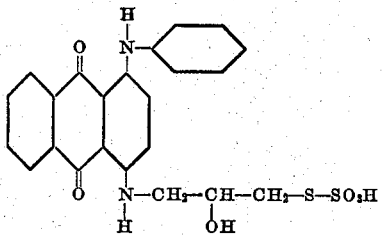

5. The product of the formula

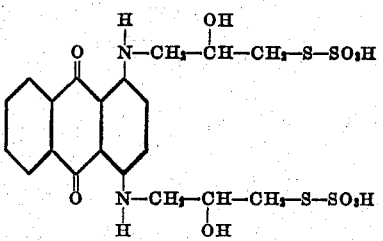

6. Process for the manufacture of α-amino-anthraquinones in which at least one amino group is substituted by a substituent of the formula $x-S-SO_3H$ wherein $x$ represents a radical selected from the group consisting of the alkylene and hydroxyalkylene radicals containing at least 2 and not more than 3 carbon atoms, comprising heating an amino-anthraquinone derivative which contains in at least one α-position an alkyl-amino group of the general formula

wherein $x$ stands for a radical selected from the group consisting of the alkylene and hydroxyalkylene radicals containing at least 2 and not more than 3 carbon atoms, with an alkali metal salt of thiosulfuric acid until said first-mentioned substituted α-amino-anthraquinone is obtained.

FRIEDRICH FELIX.
PAUL GROSSMANN.
MAX BOMMER.